United States Patent
Swerdlow

(10) Patent No.: US 12,096,310 B2
(45) Date of Patent: Sep. 17, 2024

(54) VELOCITY-BASED PRESENCE DETECTION AND ROUTING RULE SELECTION FOR PLURALITY OF MOBILE DEVICE USERS

(71) Applicant: Zoom Video Communications, Inc., San Jose, CA (US)

(72) Inventor: Nick Swerdlow, Santa Clara, CA (US)

(73) Assignee: Zoom Video Communications, Inc., San Jose, CA (US)

(*) Notice: Subject to any disclaimer, the term of this patent is extended or adjusted under 35 U.S.C. 154(b) by 0 days.

(21) Appl. No.: 17/443,948

(22) Filed: Jul. 28, 2021

(65) Prior Publication Data
US 2023/0029512 A1   Feb. 2, 2023

(51) Int. Cl.
| | | |
|---|---|---|
| H04W 4/00 | (2018.01) | |
| H04M 3/42 | (2006.01) | |
| H04M 3/54 | (2006.01) | |
| H04W 4/02 | (2018.01) | |

(52) U.S. Cl.
CPC ....... *H04W 4/027* (2013.01); *H04M 3/42348* (2013.01); *H04M 3/42374* (2013.01); *H04M 3/543* (2013.01)

(58) Field of Classification Search
CPC ............. H04W 4/027; H04M 3/42348; H04M 3/42374; H04M 3/543
See application file for complete search history.

(56) References Cited

U.S. PATENT DOCUMENTS

| | | | |
|---|---|---|---|
| 8,655,322 B2 | 2/2014 | Naaman | |
| 10,264,547 B1 | 4/2019 | Zhong et al. | |
| 10,659,598 B2 * | 5/2020 | Kadous | G06F 3/011 |
| 2002/0167488 A1 | 11/2002 | Hinckley et al. | |
| 2009/0316681 A1 * | 12/2009 | Hehmeyer | H04L 67/54 370/351 |
| 2010/0184416 A1 * | 7/2010 | Gupta | H04L 67/52 455/414.3 |
| 2011/0195699 A1 * | 8/2011 | Tadayon | H04W 48/02 455/418 |
| 2013/0222426 A1 * | 8/2013 | Hymel | H04W 4/026 345/633 |
| 2014/0120899 A1 * | 5/2014 | Wu | H04W 8/18 455/418 |
| 2015/0080016 A1 * | 3/2015 | Smith | G01S 5/0252 455/456.1 |
| 2016/0073254 A1 | 3/2016 | Rosen | |
| 2016/0088146 A1 * | 3/2016 | Ying | H04M 1/72454 455/550.1 |
| 2016/0192152 A1 * | 6/2016 | Taylor | G01C 21/3626 455/456.3 |
| 2017/0358022 A1 * | 12/2017 | Deak | G06Q 30/0631 |
| 2022/0333946 A1 * | 10/2022 | Sheha | G01C 21/3676 |

* cited by examiner

*Primary Examiner* — Pakee Fang
(74) *Attorney, Agent, or Firm* — Young Basile Hanlon & MacFarlane, P.C.

(57) ABSTRACT

A velocity of a device of a user is detected using one or more sensors of the device. If the detected velocity is within a first range, a determination is made that the user is driving. A presence update is transmitted to a server based on the detected velocity. The detected velocity may include altitude data. The server receives the presence update and updates a presence status based on the presence update. The server transmits a user interface (UI) output to a second device to update a user presence indication on a display of the second device.

20 Claims, 10 Drawing Sheets

US 12,096,310 B2

VELOCITY-BASED PRESENCE DETECTION AND ROUTING RULE SELECTION FOR PLURALITY OF MOBILE DEVICE USERS

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
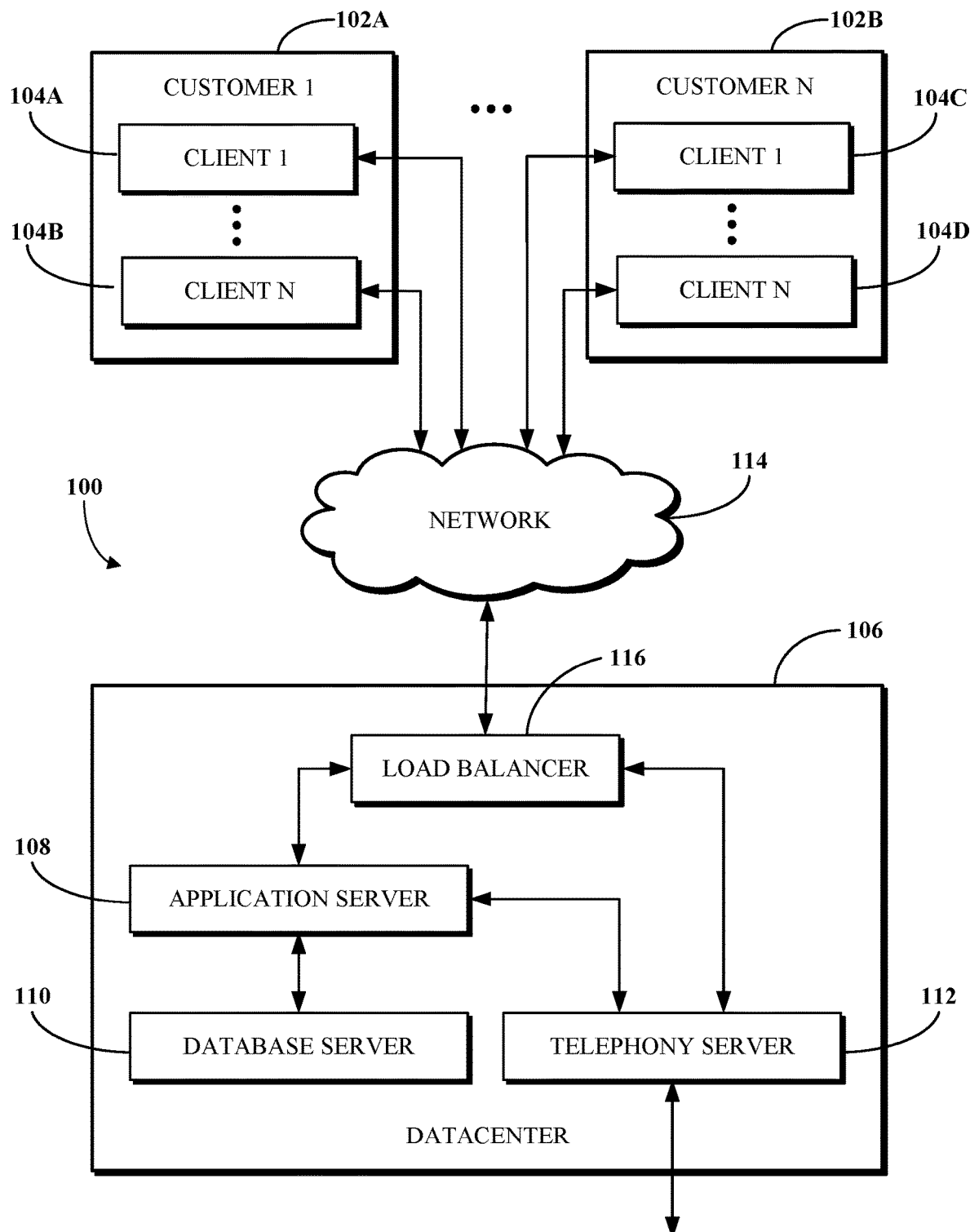
FIG. 1 is a block diagram of an example of an electronic computing and communications system.

Disclosed herein are, inter alia, implementations of systems and techniques for velocity-based presence detection and communication routing.

One aspect of this disclosure is a method that includes detecting a velocity of a mobile device of a user using one or more sensors of the mobile device. The method includes determining whether the detected velocity is within a first range. The first range may be associated with a driving velocity. The method may include determining that the user is driving based on a determination that the detected velocity is within the first range. The method may include transmitting a presence update to a server based on the detected velocity to update a user presence indicator on a client display. The presence update may indicate a communication routing preference.

Another aspect of this disclosure is a system that includes a first device, a server, and a second device. The first device may include one or more sensors, a first processor, and a transmitter. The one or more sensors may be configured to obtain sensor data. The first processor may be configured to determine a velocity of the first device based on the obtained sensor data. The first processor may be configured to determine a presence status of a user based on the determined velocity. The transmitter may be configured to transmit a presence update based on the presence status. The server may include a second processor and a transmitter. The second processor may be configured to update the presence status of the user based on the presence update. The transmitter may be configured to transmit a user interface (UI) output. The second device may include a UI configured to display a presence indicator based on the UI output.

Another aspect of this disclosure is a non-transitory computer-readable medium comprising instructions stored on a memory, that when executed by a processor, cause the processor to update a presence status of a user based on a presence update obtained from a mobile device. The presence update may be based on sensor data of the mobile device. The presence update may be associated with a velocity of the mobile device. The instructions, when executed by the processor, may cause the processor to transmit a UI output to display a presence indicator on a UI of a second device. The presence indicator may be based on the UI output.

A UCaaS platform includes several communications services accessible over a network, such as the Internet, which may be used to deliver a complete communication experience regardless of physical location. One example of a communication service implemented by a UCaaS platform is a telephony service for facilitating calls and text messages to telephone numbers or extensions assigned to users of the UCaaS platform. Users of the UCaaS platform may receive communications at inopportune times, such as while driving an automobile or traveling on an aircraft. The communications may include a telephone call, a voice over internet protocol (VOIP) call, an audio conference, a video conference, an instant message, a unified message, or another message. When a user receives a communication while driving an automobile or traveling on an aircraft, the user may be unable to answer the communication because it is unsafe to do so, disrespectful to other passengers, or they do not have service. Callers may be inconvenienced in these situations as they are often disconnected or asked to call back later. If the caller is aware of the presence status associated with travel of the communication recipient prior to placing the communication, this inconvenience can be avoided.

Relatedly, when a call is unanswered, the caller is routed to a voicemail box. In some situations, such as in a healthcare setting, routing unanswered calls to a voicemail box can have catastrophic consequences. Communication routing based on the recipient presence status when traveling may help in these situations.

Implementations of this disclosure address problems such as these using a system that can detect a change in presence and signal that change for display to allow callers to know whether a user is available to answer a communication while traveling. The conference system is configured to update the presence status of the user based on a detected velocity and/or altitude of the user, for example, using one or more sensors on a mobile device of the user. The presence status is automatically changed to "driving" or "flying" based on the detected velocity and/or altitude of the user. For example, the presence status of the user is automatically changed to "driving" when velocity is detected to be in a predetermined driving range. The predetermined driving range is based on a normal driving range or capability of an automobile, for example 15-100 miles per hour (MPH). In another example, the presence status of the user is automatically changed to "on a plane" or "flying" when velocity and/or altitude are detected to exceed a threshold. The velocity threshold is based on a velocity that is outside a normal driving range or capability of an automobile, for example 150 MPH. The altitude threshold is based on a minimum altitude of a typical flight, for example an altitude over 10,000 feet. The velocity and/or altitude ranges and thresholds discussed herein are exemplary and are based on normal driving and flying ranges and thresholds. These exemplary ranges and thresholds may be based on a machine learning (ML) model that automatically updates models of ranges and thresholds in response to data sets received from mobile devices, such as corresponding velocity and/or altitude measurements captured from device sensors. The later-acquired information may be used to verify whether those measurements accurately represent road and/or air travel. The model may adjust these values empirically over time.

Different routing rules may be used based on the modality of an incoming communication. For example, a call may be routed to a secretary of a user, a chat message may be routed to a team member of the user, and a video chat may be routed to a supervisor of the user. Routing rules may be configured to be asserted based on different sensor measurements and/or different modalities of the incoming communication. In some examples, one or more routing rules may be configured based on post-processing indicating whether another device to which the communication is routed to actually timely addressed the communication (e.g., answered the call or responded to a text, email, chat, or instant message) within a threshold time period).

To describe some implementations in greater detail, reference is first made to examples of hardware and software structures used to implement a system for velocity-based presence detection and/or communication routing. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be VOIP-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
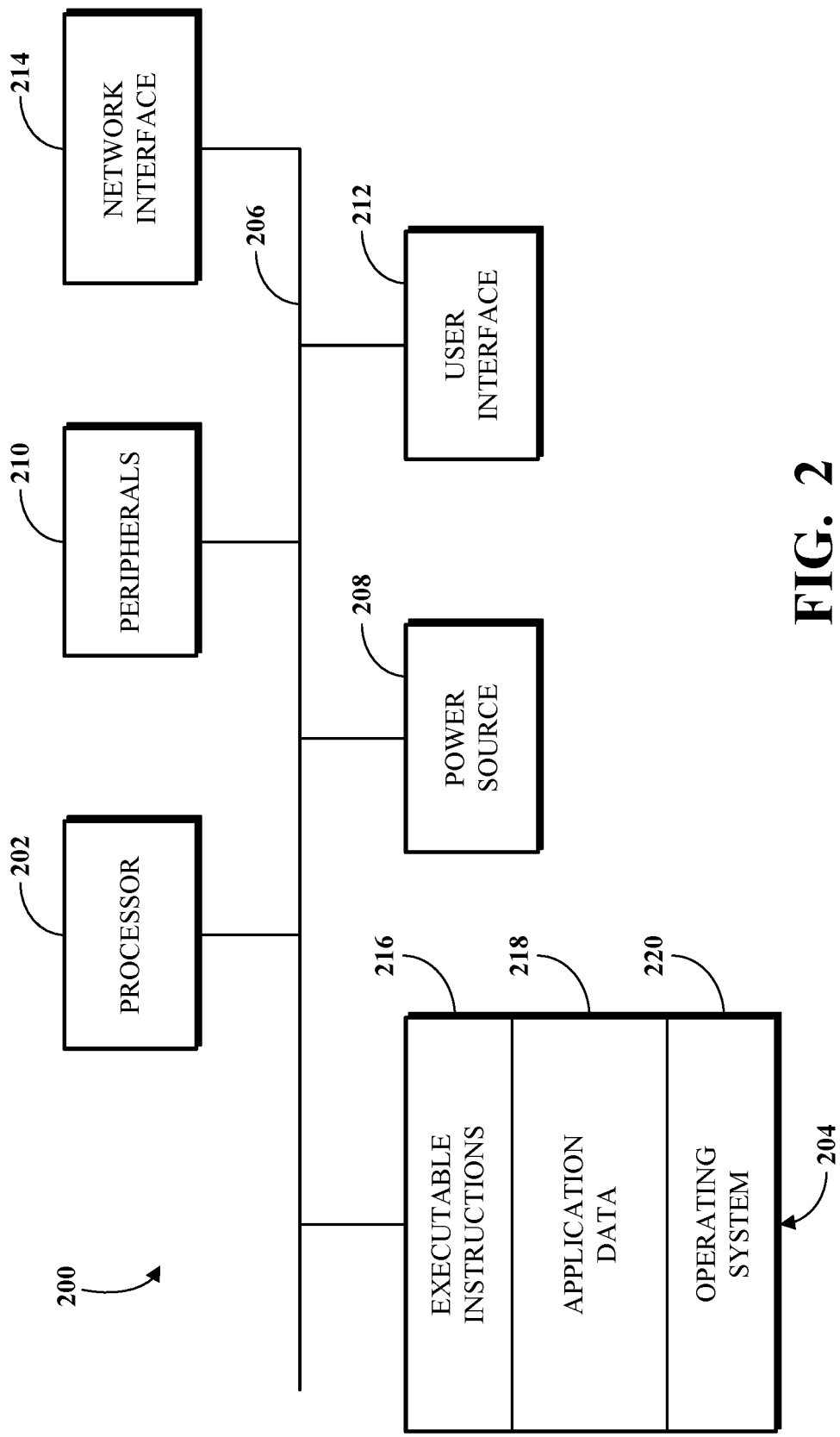
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
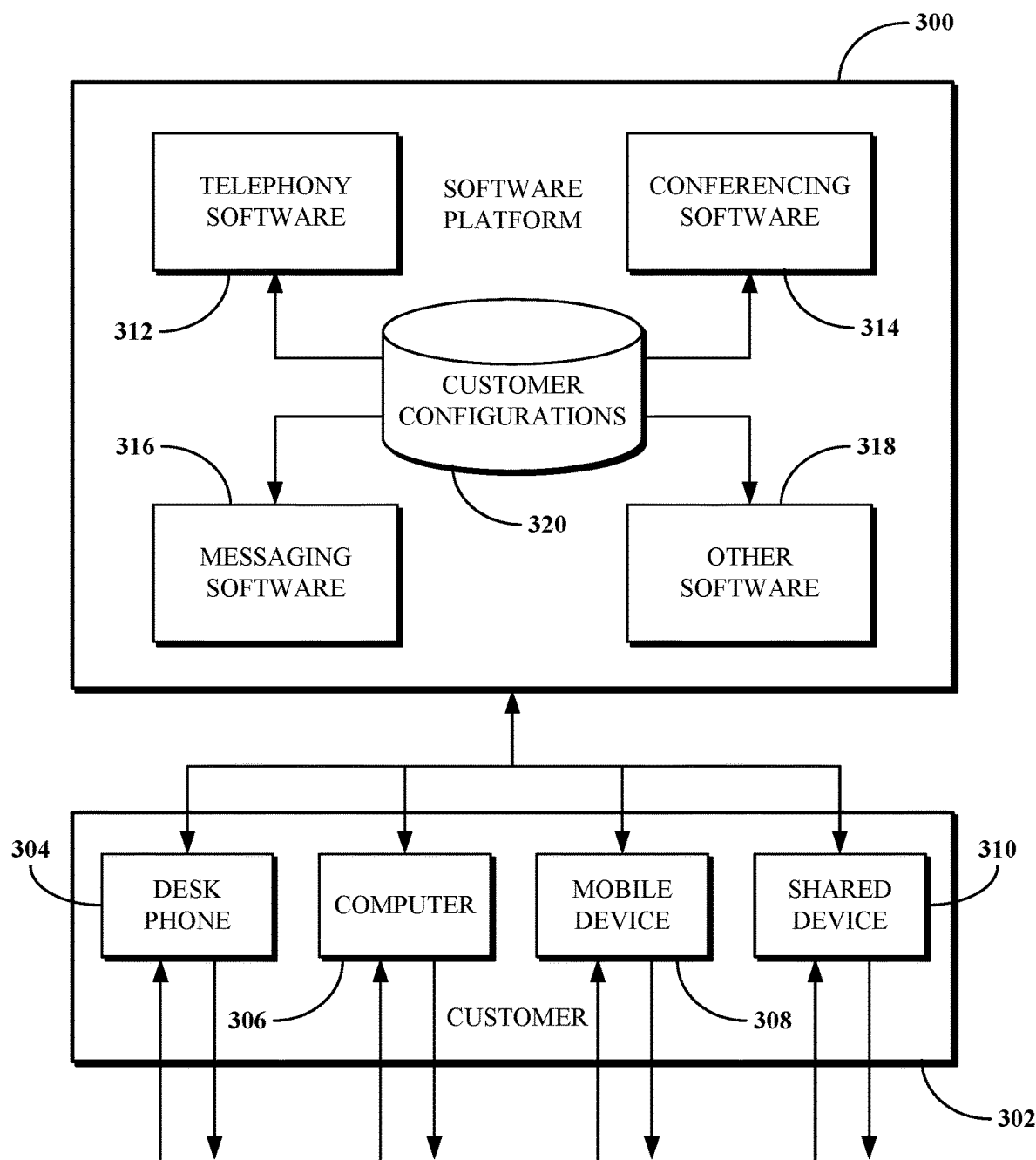
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include functionality for velocity-based presence detection and communication routing.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
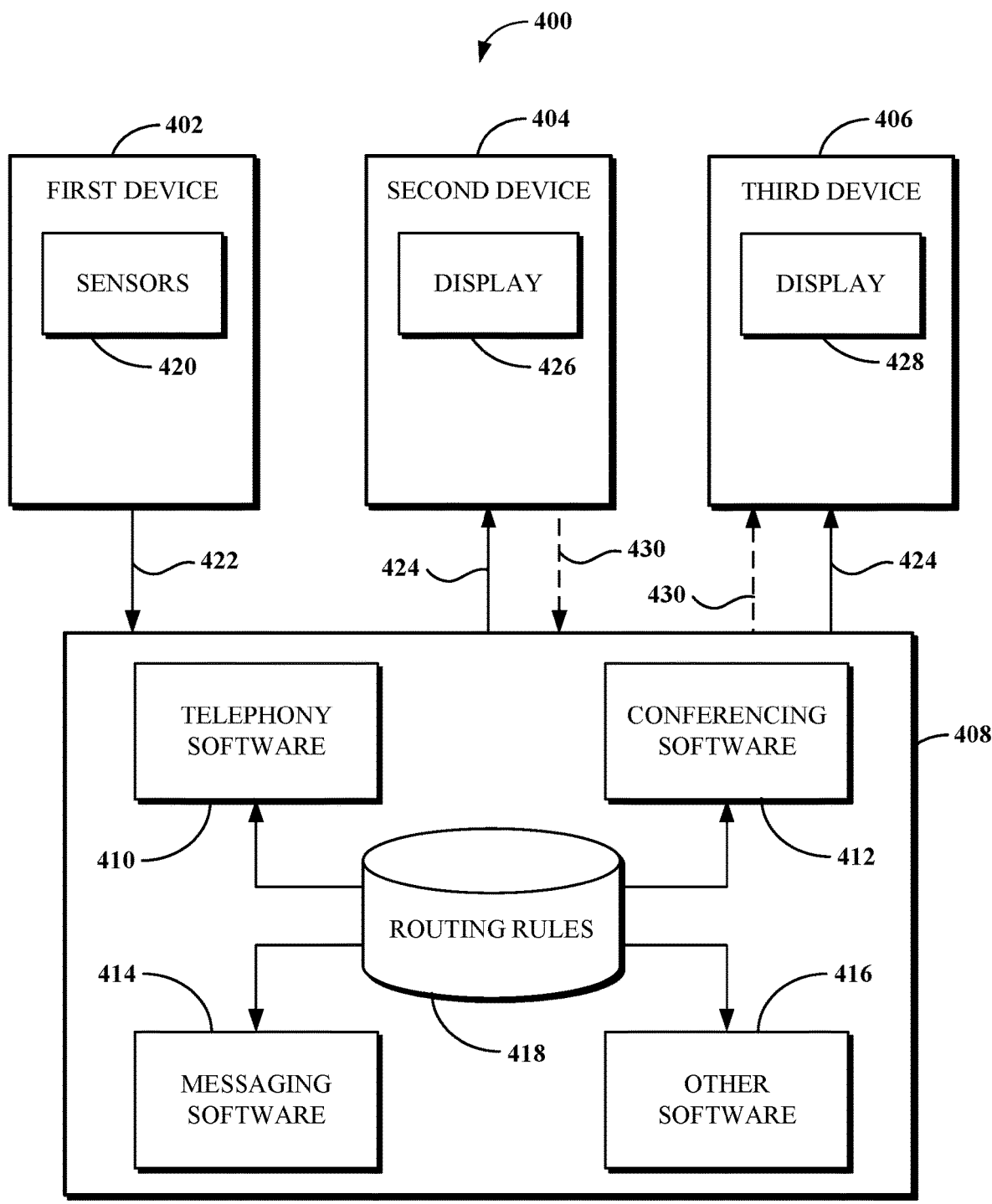
FIG. 4 is a block diagram of an example of a system for velocity-based presence detection and communication routing.

FIG. 4 is a block diagram of an example of a system 400 for velocity-based presence detection and communication routing. The system 400 includes a first device 402, a second device 404, a third device 406, and a server 408. The first device 402 may be a mobile device, such as the mobile device 308 shown in FIG. 3. The second device 404 and the third device 406 may each be a client, such as any one of the clients 304 to 310 shown in FIG. 3. The server 408 may implement a software platform, such as the software platform 300 shown in FIG. 3.

The software services of the server 408 generally relate to communications tools, but are in no way limited in scope. As shown, the software services of the server 408 include telephony software 410, conferencing software 412, messaging software 414, and other software 416, such as the software 312 through 318 shown in FIG. 3. Some or all of the software 410 through 416 uses routing rules 418 specific to a customer or user of the system 400. The routing rules 418 may, for example, be data stored within a database or other data store at a database server, such as the database server 110 shown in FIG. 1. The routing rules 418 may be based on the modality of an incoming communication. For example, a call may be routed to a secretary of a user using the telephony software 410, a chat message may be routed to a team member of the user using the messaging software 414, and a video chat may be routed to a supervisor of the user using the conferencing software.

The first device 402 includes sensors 420. The sensors 420 may include one or more accelerometers, gyroscope, magnetometers, barometers, altimeters, global positioning system (GPS) sensors, or any combination thereof. The sensors 420 are configured to capture velocity and altitude measurements. The first device 402 is configured to determine a presence status of a user based on the velocity and altitude measurements. The first device 402 is configured to transmit a presence update 422 to the server 408.

The server 408 is configured to receive the presence update 422 from the first device 402. The server 402 may use the other software 416 to update the presence status based on the presence update 422, and transmit a user interface (UI) output 424 to the second device 404 and third device 406. The server 402 may assert a routing rule from the routing rules 418 based on the presence update 422.

The second device 404 and the third device 406 are configured to receive the UI output 424 from the server 408 and display a presence indicator on their respective displays 426, 428. In this example, the second device 404 places a communication 430 intended for the first device 402. The communication 430 may be a telephone call, a VOIP call, an audio conference, a video conference, an instant message, a unified message, or another message. The server 408 is configured to receive the communication 430 intended for the first device 402 and route the communication 430 according to a routing rule of the routing rules 418. In this example, the server 408 is configured to route the communication 430 intended for the first device 402 to the third device 406.

Figure 5:
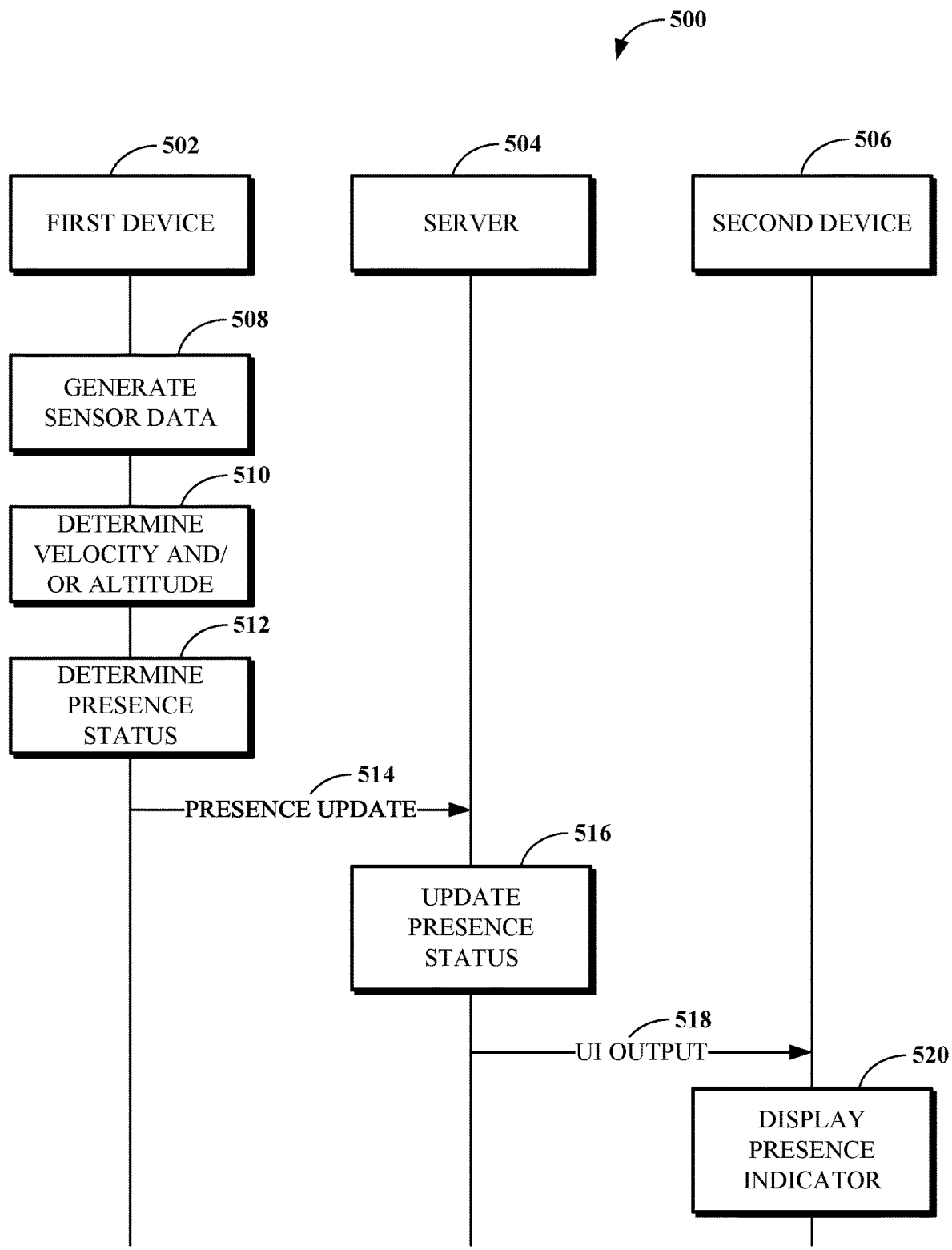
FIG. 5 is a swim lane diagram of an example of a system for velocity-based presence detection and communication routing.

FIG. 5 is a swim lane diagram of an example of a system 500 for velocity-based presence detection and communication routing. The system 500 includes a first device 502, a server 504, and a second device 506. The first device 502 may be a mobile device, such as the mobile device 308 shown in FIG. 3. The server 504 may implement a software platform, such as the software platform 300 shown in FIG. 3. The second device 506 may be a client, such as any one of the clients 304 to 310 shown in FIG. 3. The second device 506 may be configured to handle communications such as a call over telephony services, a conference invitation over conference services, a chat message over messaging services, and the like.

As shown in FIG. 5, the first device 502 is configured to generate 508 sensor data, such as sensor measurements, from one or more sensors of the first device 502. The one or more sensors may include one or more accelerometers, gyroscope, magnetometers, barometers, altimeters, GPS sensors, or any combination thereof. The first device 502 is configured to determine 510 a velocity and/or altitude of the first device 502 based on the sensor data, for example, using a client application on the first device 502.

In this example, the first device 502 is configured to determine 512 a presence status based on the determined velocity and/or altitude, for example, using the client application on the first device 502 to map the sensor data to a modeled threshold or range. For example, the client application may use an ML model that automatically updates models of ranges and thresholds in response to data sets received from mobile devices, such as corresponding velocity and/or altitude measurements captured from device sensors. The later-acquired information may be used to verify whether those measurements accurately represent road and/or air travel. The model may adjust these values empirically over time. The presence status may be determined as "driving" or "flying" based on the detected velocity and/or altitude of the user. For example, the presence status of the user may be determined as "driving" when velocity is detected to be in a predetermined driving range, such as 15-100 MPH. In some implementations, frequency of velocity changes may be used to determine the presence status. For example, in stop-and-go traffic, if the frequency of the velocity changes is above a threshold, then the system may determine that the user is in stop-and-go traffic and the presence status would remain as "driving." Input from other sensors of the first device 502 may be used to determine whether the user is in stop-and go traffic. In some examples, the velocity and a predetermined time may be used to determine whether the user is in stop-and-go traffic. For example, if the velocity is detected to be zero for a duration that exceeds the predetermined time, the system may determine that the user is no longer in stop-and-go traffic. In another example, the presence status of the user may be determined as "on a plane" or "flying" when velocity and/or altitude are detected to exceed a threshold, such as 100 MPH and/or an altitude over 10,000 feet.

The first device 502 is configured to transmit a presence update 514 to the server 504. The presence update 514 includes an indication of the determined presence status. The server 504 is configured to receive the presence update 514 from the first device 502 and update 516 a presence status for the user on the system 500. The presence status may be updated based on the indicated presence status received in the presence update 514. Updating the presence status may include updating the presence status of the user of the first device 502 across one or more communication services.

In some implementations, updating the presence status may include asserting a communication routing rule. The communication routing rule may be updated based on a user preference or configured by an administrator setting. In some cases, the routing of communications may be handled differently based on whether the user is determined to be driving or flying. For example, a user preference may indicate that the user is comfortable taking a call when driving at a highway cruising speed and therefore allow calls to be routed to the user when the system 500 determines that the user is driving at a highway cruising speed. In this example, the user preference may also indicate that the user is uncomfortable taking a call when driving at city speeds and therefore have calls routed to another user when the system 500 determines that the user is driving at a city speed.

The server 504 is configured to transmit a UI output 518 to the second device 506. The UI output 518 includes data associated with the updated presence status. The second device 506 receives the UI output 518 from the server 504 and displays 520 a presence indicator on a UI of the second device 506. The presence indicator displayed on the UI of the second device 506 is based on the updated presence status indicated in the UI output 518. In an example, the presence indicator may be displayed as an icon of a vehicle or an airplane to indicate that the user is driving or flying.

In some implementations, the presence status may be determined at the server 504. For example, the server 504 is configured to receive the velocity data from the first device 502. The velocity data may include altitude data. In these implementations, the server 504 is configured to determine a presence status based on the determined velocity and/or altitude.

Figure 6:
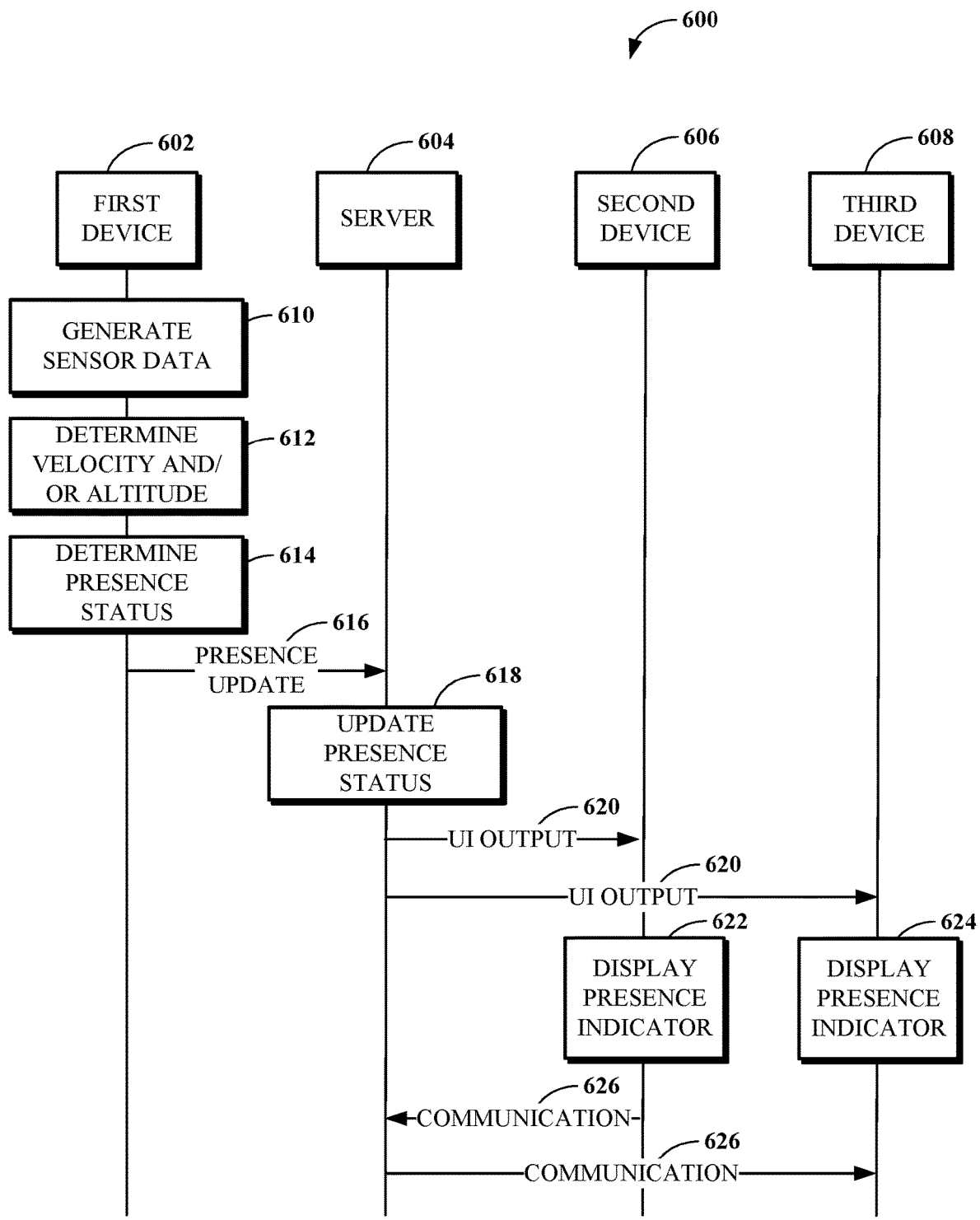
FIG. 6 is a swim lane diagram of another example of a system for velocity-based presence detection and communication routing.

FIG. 6 is a swim lane diagram of another example of a system 600 for velocity-based presence detection and communication routing. The system 600 includes a first device 602, a server 604, a second device 606, and a third device 608. The first device 602 may be a mobile device, such as the mobile device 308 shown in FIG. 3. The server 604 may implement a software platform, such as the software platform 300 shown in FIG. 3. The second device 606 may be a client, such as any one of the clients 304 to 310 shown in FIG. 3. The third device 608 may be a client, such as any one of the clients 304 to 310 shown in FIG. 3.

As shown in FIG. 6, the first device 602 is configured to generate 610 sensor data from one or more sensors of the first device 602. The one or more sensors may include one or more accelerometers, gyroscope, magnetometers, barometers, altimeters, GPS sensors, or any combination thereof. The first device 602 is configured to determine 612 a velocity and/or altitude based on the sensor data, for example, using a client application on the first device 602.

In this example, the first device 602 is configured to determine 614 a presence status based on the determined velocity and/or altitude, for example, using the client application on the first device 602 to map the sensor data to a modeled threshold or range. For example, the client application may use an ML model that automatically updates models of ranges and thresholds in response to data sets received from mobile devices, such as corresponding velocity and/or altitude measurements captured from device sensors. The later-acquired information may be used to verify whether those measurements accurately represent road and/or air travel. The model may adjust these values empirically over time. The presence status may be determined as "driving" or "flying" based on the detected velocity and/or altitude of the user. For example, the presence status of the user may be determined as "driving" when velocity is detected to be in a predetermined driving range, such as 15-100 MPH. In another example, the presence status of the user may be determined as "on a plane" or "flying" when velocity and/or altitude are detected to exceed a threshold, such as 100 MPH and/or an altitude over 10,000 feet.

The first device 602 is configured to transmit a presence update 616 to the server 604. The presence update 616 includes an indication of the determined presence status. The server 604 is configured to receive the presence update 616 from the first device 602 and update 618 a presence status for the user on the system 600. The presence status may be updated based on the indicated presence status received in the presence update 616. Updating the presence status may include updating the presence status of the user of the first device 602 across one or more communication services.

In some implementations, updating the presence status may include asserting a communication routing rule. The communication routing rule may be updated based on a user preference or configured by an administrator setting. In some cases, the routing of communications may be handled differently based on whether the user is determined to be driving or flying. For example, a user preference may indicate that the user is comfortable taking a call when driving at a highway cruising speed and therefore allow calls to be routed to the user when the system 600 determines that the user is driving at a highway cruising speed. In this example, the user preference may also indicate that the user is uncomfortable taking a call when driving at city speeds and therefore have calls routed to another user when the system 600 determines that the user is driving at a city speed.

The server 604 is configured to transmit a UI output 620 to the second device 606 and the third device 608. The UI output 620 includes data associated with the updated presence status. The second device 606 receives the UI output 620 from the server 604 and displays 622 a presence indicator on a UI of the second device 606. The third device 608 receives the UI output 620 from the server 604 and displays 624 a presence indicator on a UI of the third device 608. The presence indicators displayed on the UI of the second device 606 and the third device 608 are based on the updated presence status indicated in the UI output 620. In an example, the presence indicator may be displayed as an icon of a vehicle or an airplane to indicate that the user is driving or flying.

In this example, the second device 606 places a communication 626 intended for the first device 602. The communication 626 may be a telephone call, a VOIP call, an audio conference, a video conference, an instant message, a unified message, or another message. The server 604 is configured to receive the communication 626 intended for the first device 602 and route the communication 626 according to a routing rule. In this example, the server 604 is configured to route the communication 626 intended for the first device 602 to the third device 608.

In some implementations, the presence status may be determined at the server 604. For example, the server 604 is configured to receive the velocity data from the first device 602. The velocity data may include altitude data. In these implementations, the server 604 is configured to determine a presence status based on the determined velocity and/or altitude.

To further describe some implementations in greater detail, reference is next made to examples of methods that may be performed by or using a system configured for velocity-based presence detection. FIGS. 7-10 are flowcharts of examples of methods for velocity-based presence detection and/or communication routing. The methods can be executed using computing devices, such as the systems, hardware, and software described with respect to FIGS. 1-6. The methods can be performed, for example, by executing a machine-readable program or other computer-executable instructions, such as routines, instructions, programs, or other code. The steps, or operations, of the methods or other techniques, methods, processes, or algorithms described in connection with the implementations disclosed herein can be implemented directly in hardware, firmware, software executed by hardware, circuitry, or a combination thereof.

For simplicity of explanation, the methods are depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 7:
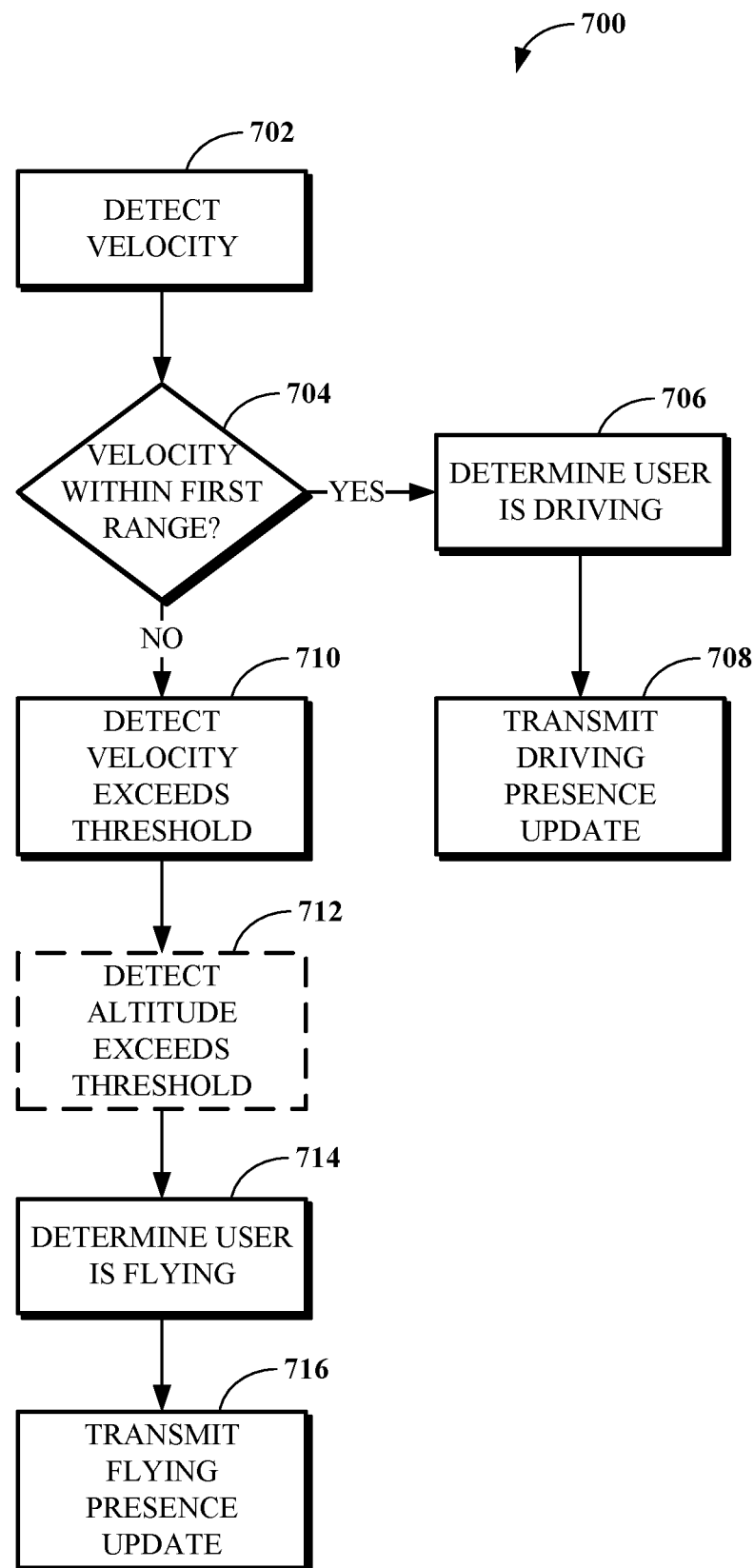
FIG. 7 is a flow diagram of an example of a method for velocity-based presence detection.

FIG. 7 is a flow diagram of an example of a method 700 for velocity-based presence detection. At 702, a mobile device detects a velocity of a user using one or more sensors of the mobile device. The one or more sensors may include one or more accelerometers, gyroscope, magnetometers, barometers, altimeters, GPS sensors, or any combination thereof.

At 704, the mobile device, or a server, determines whether the detected velocity is within a first range. The first range may be based on a normal driving range or capability of an automobile, for example 15-100 MPH. The first range may be user configurable or set by an administrator of the system. If it is determined that the detected velocity is within a first range, the mobile device or server determines 706 that the user is driving. Based on the determination that the user is driving, the server transmits 708 a presence update to another device. The presence update may be transmitted in a UI output that causes the other device to display a presence indicator on a UI of the other device.

If it is determined that the detected velocity is not within the first range at 704, the one or more sensors may detect 710 that the velocity exceeds a threshold. The threshold may be based on a velocity that is outside the normal driving range or capability of an automobile, for example 150 MPH. In some examples, the one or more sensors may detect 712 an altitude that exceeds a threshold. The threshold for altitude may be based on a normal altitude threshold for an airplane, for example 10,000 feet above sea level. At 714, the mobile device or the server may determine that the user is flying. The determination that the user is flying may be based on one or more of the detected velocity and the detected altitude.

In some situations, a user velocity may fluctuate in and out of the first range when driving, such as, for example, in stop-and-go traffic. In these situations, it could be frustrating to a caller to see the presence indicator associated with the user frequently fluctuating between "driving" and "available."

Figure 8:
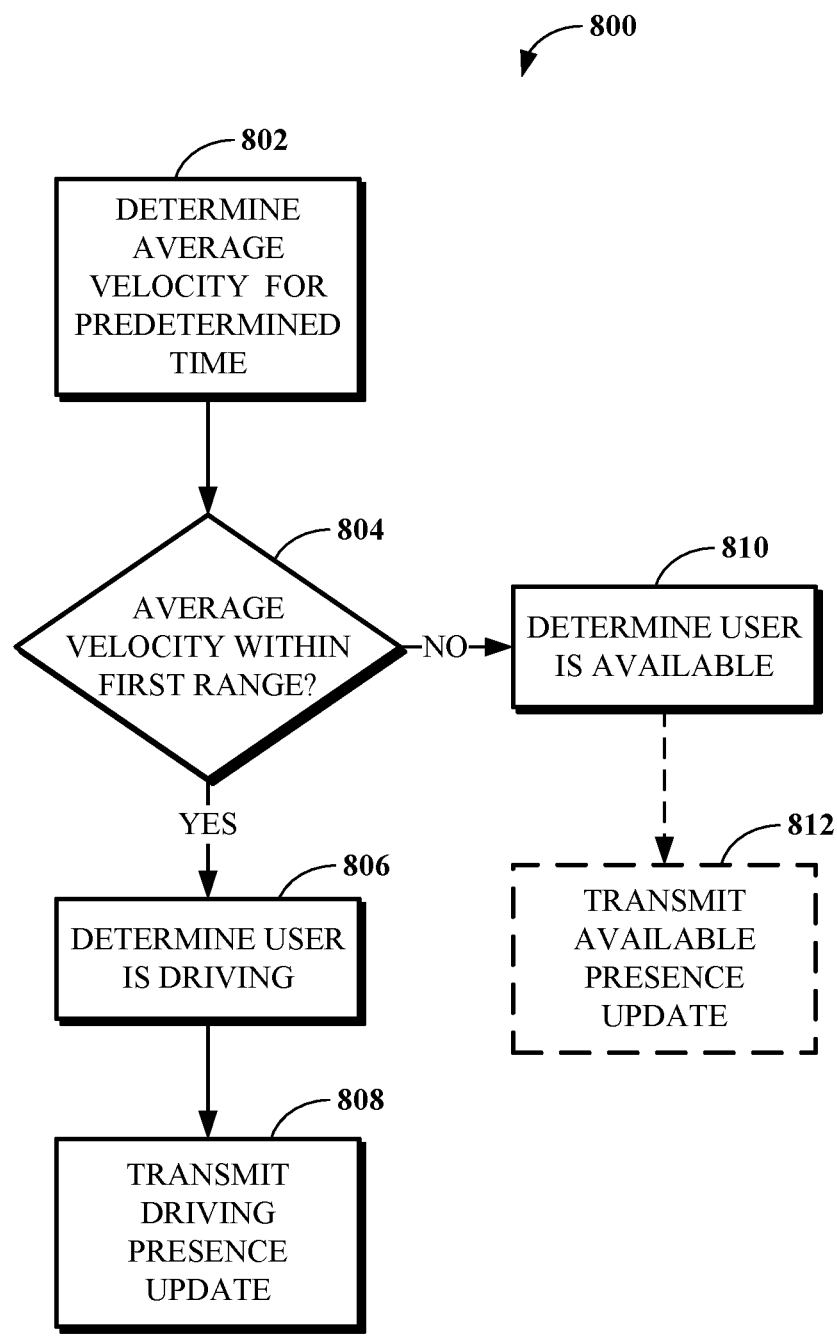
FIG. 8 is a flow diagram of another example of a method for velocity-based presence detection.

FIG. 8 is a flow diagram of another example of a method 800 for velocity-based presence detection when a user velocity is fluctuating. At 802, one or more sensors of a mobile device may be used to determine an average velocity of the user for a predetermined time. The predetermined time may be based on a stored user preference or administrator setting. In this example, a first range may be a user configurable value that is associated with a driving velocity where the user is comfortable taking a call while driving. In some examples, the first range may be set by an administrator of the system.

At 804, if the average user velocity is determined to be within the first range, for example, for 2 minutes, the mobile device determines at 806 that the user is driving and at 808 transmits a presence update that indicates that the user is driving to a server. In this example, if the average velocity is determined at 804 to be within the first range for less than 2 minutes, the mobile device determines at 810 that the user is available based on the average velocity being in a predetermined safe range to take a call. If the current presence indicator of the user is "driving" or "away," the mobile device transmits an "available" presence update to the server at 812. In some examples, the determination of whether the user is driving or available may be made at the server, for example, in response to receiving an average velocity value from the mobile device.

In some situations, such as in a healthcare setting, the recipient of a communication, i.e., a user of the system, may not want to automatically send the caller to voicemail when the recipient is unavailable to answer the communication, particularly when the recipient is traveling. In these situations, the communication can be rerouted based on a detected velocity and/or altitude of the user. The communication may be rerouted to an executive assistant of the user, a supervisor of the user, or another colleague based on a user preference. For example, when the user is determined to be driving, the communication can be rerouted to the supervisor, and when the user is flying, the communication can be rerouted to another colleague.

Figure 9:
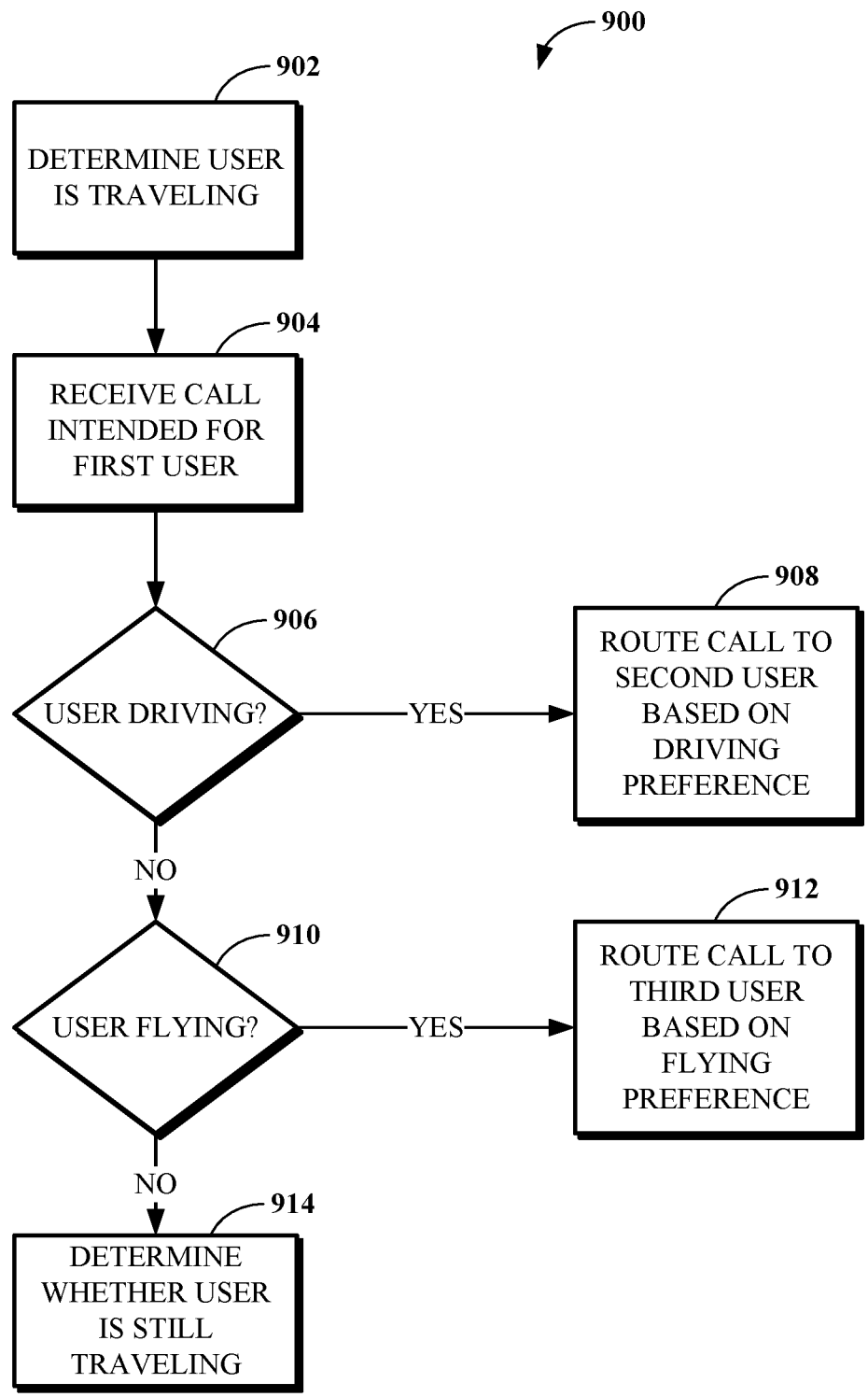
FIG. 9 is a flow diagram of an example of a method for velocity-based communication routing.

FIG. 9 is a flow diagram of an example of a method 900 for velocity-based communication routing using a velocity-based presence status of the recipient. At 902, a mobile device or a server determines that the user is traveling based on sensor data from one or more sensors of the mobile device.

At 904, the server may receive a communication intended for a first user. At 906, the server determines whether the user is driving based on a presence status of the user. If it is determined at 906 that the user is driving, the server routes the communication at 908 to a second user, for example a colleague of the user, based on a driving preference. The driving preference may be a communication routing rule based on a user preference or administrator setting for routing a communication when the user is determined to be driving. In some implementations, the routing rule may include a rule for escalating a communication based on a voicemail. For example, if a voicemail is not answered within a predetermined time and it is determined that the first user is driving, the communication may be escalated to be routed to the first user, even though the first user is determined to be driving. In this example, if it is determined that the voicemail is answered within the predetermined time and it is determined that the first user is driving, the call may not be escalated and routed to the second user.

If it is determined at 906 that the user is not driving, the server determines at 910 whether the user is flying based on the presence status of the user. If it is determined at 910 that the user is flying, the server routes the communication at 912 to a third user, for example a supervisor of the user, based on a flying preference. The flying preference may be a communication routing rule based on a user preference or an administrator setting for routing a communication when the user is determined to be flying. If it is determined at 910 that the user is not flying, a determination may be made at 914 whether the user is still traveling.

Figure 10:
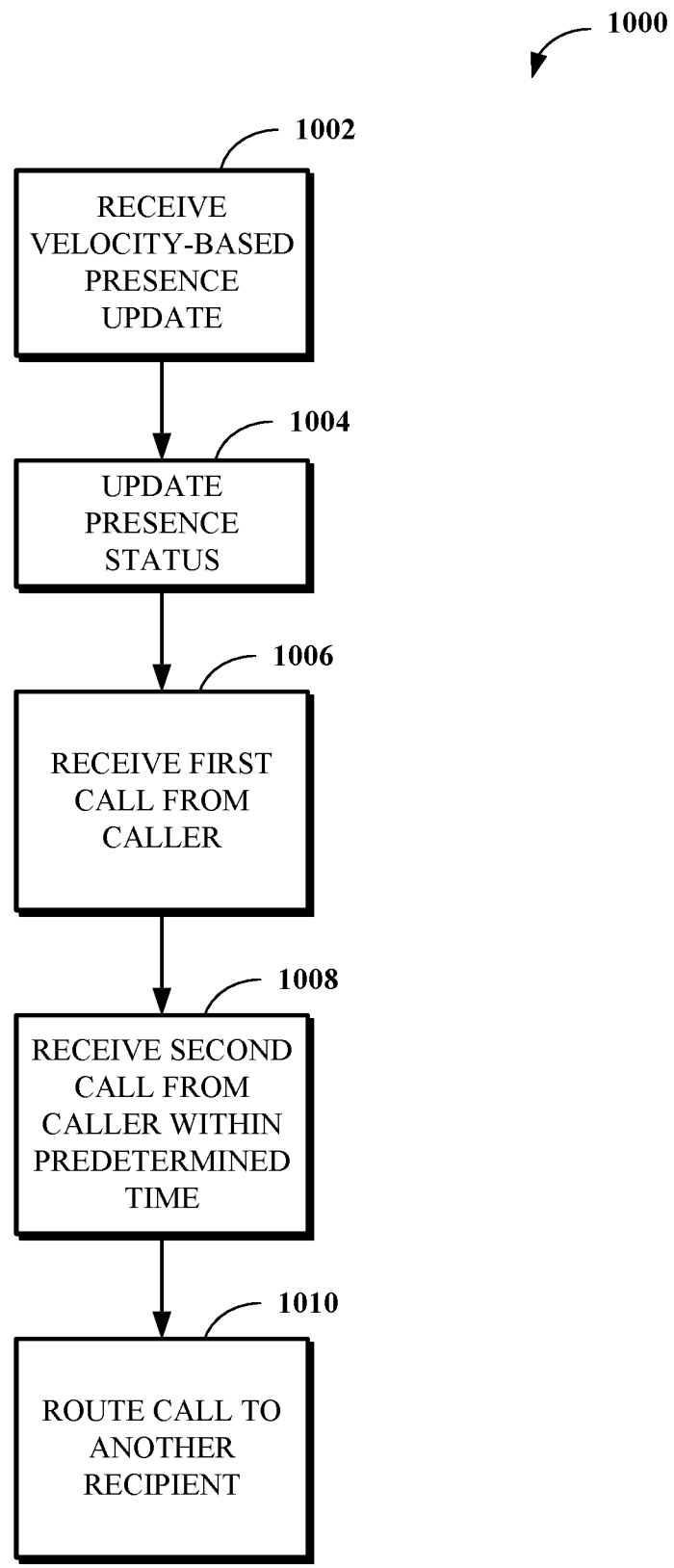
FIG. 10 is a flow diagram of another example of a method for velocity-based communication routing.

FIG. 10 is a flow diagram of another example of a method for velocity-based communication routing. At 1002, a server may receive a velocity-based presence update from a mobile device of a user. At 1004, the server may update the presence status of the user based on the velocity-based presence update. At 1006, the server may receive a communication from a caller that is intended for the user where the user is determined to be unavailable based on the velocity-based presence update from the mobile device of the user. Based on the presence status of the user, the caller may be directed to a voicemail box of the user. At 1008, the server may receive a second communication from the caller within a predetermined time. The predetermined time may be based on a user preference or an administrator setting. For example, the predetermined time may be set such that receiving a second communication within that time indicates a sense of urgency for the communication. In an example, the predetermined time may be set to less than one minute. Based on receiving the second communication within the predetermined time, the server may determine a certain urgency of the communication. The communication may then be escalated and routed to another recipient at 1010. The other recipient may be based on a user preference or an administrator communication routing rule. For example, when the user is driving, the communication can be rerouted to a supervisor of the user, and when the user is flying, the communication can be rerouted to another colleague of the user.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   detecting a velocity of a mobile device of a user using one or more sensors of the mobile device;
   determining whether the detected velocity is within a first range, the first range associated with a driving velocity;
   responsive to a determination that the detected velocity is within the first range, determining that the user is driving; and
   transmitting a presence update associated with a travel status to a server of a unified communications as a service (UCaaS) platform based on the detected velocity to update a user presence indicator on a remote client display and to assert a communication routing rule that is based on a modality of an incoming communication, wherein the communication routing rule indicates to route the incoming communication to a first device associated with a first user when the modality is a first modality and to route the incoming communication to a second device associated with a second user when the modality is a second modality.

2. The method of claim 1, wherein the presence update indicates that the user is driving.

3. The method of claim 1, comprising:
   determining that the detected velocity exceeds a velocity threshold by comparing the detected velocity to the velocity threshold; and
   determining that the user is flying based on the determination that the detected velocity exceeds the threshold.

4. The method of claim 1, comprising:
 determining that the detected velocity exceeds a velocity threshold by comparing the detected velocity to the velocity threshold; and
 determining that the user is flying based on the determination that the detected velocity exceeds the threshold, wherein the presence update indicates that the user is flying.

5. The method of claim 1, comprising:
 detecting an altitude of the mobile device using the one or more sensors of the mobile device;
 determining that the detected altitude exceeds an altitude threshold; and
 determining that the user is flying based on the determination that the detected altitude exceeds the altitude threshold.

6. The method of claim 1, wherein the communication routing preference is to route an incoming call to a device of a colleague of the user.

7. The method of claim 1, comprising:
 determining that the detected velocity exceeds a velocity threshold by comparing the detected velocity to the velocity threshold, wherein the velocity threshold is based on a velocity that is outside a normal driving range or capability of an automobile.

8. The method of claim 1, wherein the first range is based on a normal driving range or capability of an automobile.

9. A mobile device comprising:
 one or more sensors configured to detect a velocity of the mobile device;
 a processor configured to:
  determine whether the detected velocity is within a first range, the first range associated with a driving velocity; and
  responsive to a determination that the detected velocity is within the first range, determine that a user is driving; and
 a transmitter configured to transmit a presence update associated with a travel status to a server of a unified communications as a service (UCaaS) platform based on the detected velocity to update a user presence indicator on a remote client display and to assert a communication routing rule that is based on a modality of an incoming communication, wherein the communication routing rule indicates to route the incoming communication to a first device associated with a first user when the modality is a first modality and to route the incoming communication to a second device associated with a second user when the modality is a second modality.

10. The mobile device of claim 9, wherein the presence update indicates that the user is driving.

11. The mobile device of claim 9, wherein the processor is configured to:
 determine that the velocity exceeds a velocity threshold by comparing the velocity to the velocity threshold; and
 determine that the user is flying based on the determination that the velocity exceeds the threshold.

12. The mobile device of claim 9, wherein the processor is configured to:
 determine that the velocity exceeds a velocity threshold by comparing the velocity to the velocity threshold; and
 determine that the user is flying based on the determination that the velocity exceeds the threshold, wherein the presence update indicates that the user is flying.

13. The mobile device of claim 9, wherein the processor is configured to determine that an altitude exceeds an altitude threshold responsive to the one or more sensors detecting the altitude.

14. The mobile device of claim 9, wherein the processor is configured to:
 determine that the velocity exceeds a velocity threshold by comparing the velocity to the velocity threshold, wherein the velocity threshold is based on a velocity that is outside a normal driving range or capability of an automobile; and
 determine that the user is flying based on the determination that the velocity exceeds the threshold.

15. A non-transitory computer-readable medium comprising instructions stored on a memory, that when executed by a processor, cause the processor to:
 detect a velocity of a mobile device of a user using one or more sensors of the mobile device,
 determine whether the detected velocity is within a first range, the first range associated with a driving velocity;
 responsive to a determination that the detected velocity is within the first range, determine that the user is driving; and
 transmit a presence update associated with a travel status to a server of a unified communications as a service (UCaaS) platform based on the detected velocity to update a user presence indicator on a remote client display and to assert a communication routing rule that is based on a modality of an incoming communication, wherein the communication routing rule indicates to route the incoming communication to a first device associated with a first user when the modality is a first modality and to route the incoming communication to a second device associated with a second user when the modality is a second modality.

16. The non-transitory computer-readable medium of claim 15, wherein the presence update indicates that the user is driving.

17. The non-transitory computer-readable medium of claim 15, wherein the instructions, when executed by the processor, cause the processor to:
 determine that the velocity exceeds a velocity threshold by comparing the velocity to the velocity threshold; and
 determine that the user is flying based on the determination that the velocity exceeds the threshold.

18. The non-transitory computer-readable medium of claim 15, wherein the processor is further configured to:
 determine that the velocity exceeds a velocity threshold by comparing the velocity to the velocity threshold, and
 determine that the user is flying based on the determination that the velocity exceeds the threshold, wherein the presence update indicates that the user is flying.

19. The non-transitory computer-readable medium of claim 15, wherein the presence update includes an altitude.

20. The non-transitory computer-readable medium of claim 15, wherein the processor is further configured to:
 determine that the velocity exceeds a velocity threshold by comparing the velocity to the velocity threshold, wherein the velocity threshold is based on a velocity that is outside a normal driving range or capability of an automobile; and
 determine that the user is flying based on the determination that the velocity exceeds the threshold.

* * * * *